United States Patent [19]

Lewakowski et al.

[11] 3,875,994
[45] Apr. 8, 1975

[54] REGENERATOR FOR GAS TURBINE ENGINE

[76] Inventors: John Janusz Lewakowski, 3346 Winterfield, Warren, Mich. 48092; Theodore Melchoir Ciagala, 26802 Palomino, Warren, Mich. 48089

[22] Filed: Dec. 26, 1973

[21] Appl. No.: 428,567

[52] U.S. Cl. ......... 165/10; 29/157.3 R; 60/39.51 H; 165/8
[51] Int. Cl. .................................... F28d 19/00
[58] Field of Search ........ 165/9, 8, 10; 29/157.3 R; 60/39.51

[56] References Cited
UNITED STATES PATENTS
3,534,807  10/1970  Bracken, Jr. ........................ 165/9
3,559,264  2/1971  Bracken, Jr. ...................... 29/157.3 R

*Primary Examiner*—Albert W. Davis, Jr.
*Attorney, Agent, or Firm*—Talburtt & Baldwin

[57] ABSTRACT

A rotatable drum type regenerator for an automobile gas turbine engine comprises a steel matrix of thin stock having a peripheral portion connected in radially sliding and sealing relationship to the adjacent radially inner portion at the hot axial end region of the matrix to accommodate thermal cycling and to prevent rupture between the peripheral and adjacent inner portions, the peripheral portion being positively connected to the adjacent radially inner portion by brazing at the cooler axial end region to withstand the various forces between the latter portions.

23 Claims, 5 Drawing Figures

REGENERATOR FOR GAS TURBINE ENGINE

BACKGROUND AND SUMMARY OF THE INVENTION

In a typical drum type regenerator, a rotatable matrix comprises a multitude of axially extending thin-walled gas passages of small hydraulic diameter. Suitable baffles and seals direct comparatively cool high pressure inlet combustion supporting air axially in one direction through the rotating matrix at one location to preheat the inlet air. Fuel is burned in the pre-heated inlet air and the resulting hot gages are discharged through the turbine stages and then directed in the axially opposite direction at another location through the rotating matrix to heat the same. An axial temperature gradient is thus maintained in the matrix between a hot axial end face thereof and an axially opposed comparatively cool axial end face during operation. Typically a fixed or non-rotatable seal rides on a peripheral portion of the matrix in sliding and fluid sealing relationship, whereby gas flow through the peripheral matrix portion is blocked and heating or cooling of the peripheral portion is retarded with respect to the corresponding heating and cooling of the main body of the matrix during operation.

In consequence of the cyclic nature of operation of an automobile gas turbine engine, the juncture between the peripheral portion of the matrix and the adjacent radially inner portion is subject to severe thermally induced stress in addition to other loads resulting from mechanical and pressure forces during operation. The thin walls of the matrix gas passages unobstructed by seals respond rapidly to temperature changes, whereas the peripheral portion of the matrix protected by seals responds more slowly to temperature changes. At the beginning of a heating cycle, rapid thermal expansion of the matrix crushes the latter against the cooler and slower to expand periphery. During the next cooling cycle after the periphery has attained its operating temperature and has expanded thermally, the compacted matrix material adjacent the periphery contracts and pulls away from the expanded periphery, which cools and contracts more slowly.

The repeated flexing stresses combined with other forces resulting from the gas pressure differential across the customary seals, and the frictional resistance of the seals rubbing against axially opposite ends of the rotating matrix, result in extensive rupture and circumferentially elongated cracks between the peripheral and adjacent radially inner portion especially near the hot axial end surface of the matrix where the maximum differential thermal expansion and contraction occur, with consequent circumferential leakage of gases across the seals which separate the aforesaid cool high pressure inlet air or gases from the hot and lower pressure exhaust gases. A portion of the inlet air thus bypasses the regenerator and the turbine stages to the extent that the loss in engine efficiency becomes intolerable.

Prior attempts to overcome the problem described have only been partially successful with a metal regenerator having a comparatively large coefficient of thermal expansion. In order to achieve regenerator efficiency, the matrix must comprise thin stock, such that even a matrix of expensive stainless steel tends to rupture under the forces involved. Attempts to use heavier gage material at the radially outer portions of the matrix merely displace the flexing and rupture to the radially inwardly adjacent thinner gage material.

An object of the invention is to provide an improvement in the concept of a gas turbine regenerator of the type illustrated in U.S. Pat. No. 3,534,807 and in co-pending patent application Ser. No. 334,554, filed 22 Feb. 1973, wherein a sliding juncture between the body of the matrix and its periphery allows thermal expansion and contraction of the periphery of the matrix freely relative to the matrix body. The latter patent and application are incorporated herein by way of reference to facilitate understanding of the structure and operation of the present invention.

Another object is to provide an improved spirally wound matrix and sliding juncture between the matrix body and peripheral portion of the matrix.

Another object is to provide practical means for accommodating the aforesaid forces and to avoid the specific rupture problem encountered with the sliding juncture of the type described, wherein the sliding juncture is confined to the hotter major portion of the axial length of the regenerator, thereby to obtain a rugged unitary matrix having exceptional durability and an acceptable operating life when subject to operating forces.

Other objects are to provide such a regenerator which may be economically and comparatively easily fabricated without sacrificing structural requirements imposed by operating forces on the regenerator and without adding gas leakage paths between high and low pressure regions of the matrix.

Another and more specific object is to provide such a matrix wherein the flexible connection may comprise closely interfitting corrugations in radially sliding sealing engagement prior to operation, such that the matrix at the connection will crush on expansion and yield against the periphery, but wherein the flexible connection will accommodate subsequent contraction of the body of the matrix with respect to the periphery without causing rupture and leakage.

Still another object is to provide an improved method of manufacturing and using a regenerator of the type described having a radially sliding juncture between the peripheral and radially inner portions of the matrix throughout the major axial extent of the latter measured from the hot face and having a comparatively rigid juncture between the peripheral and radially inner portions throughout the remaining axial extent of the matrix.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 3 is on an enlarged scale with respect to FIG. 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENT

Figure 1:
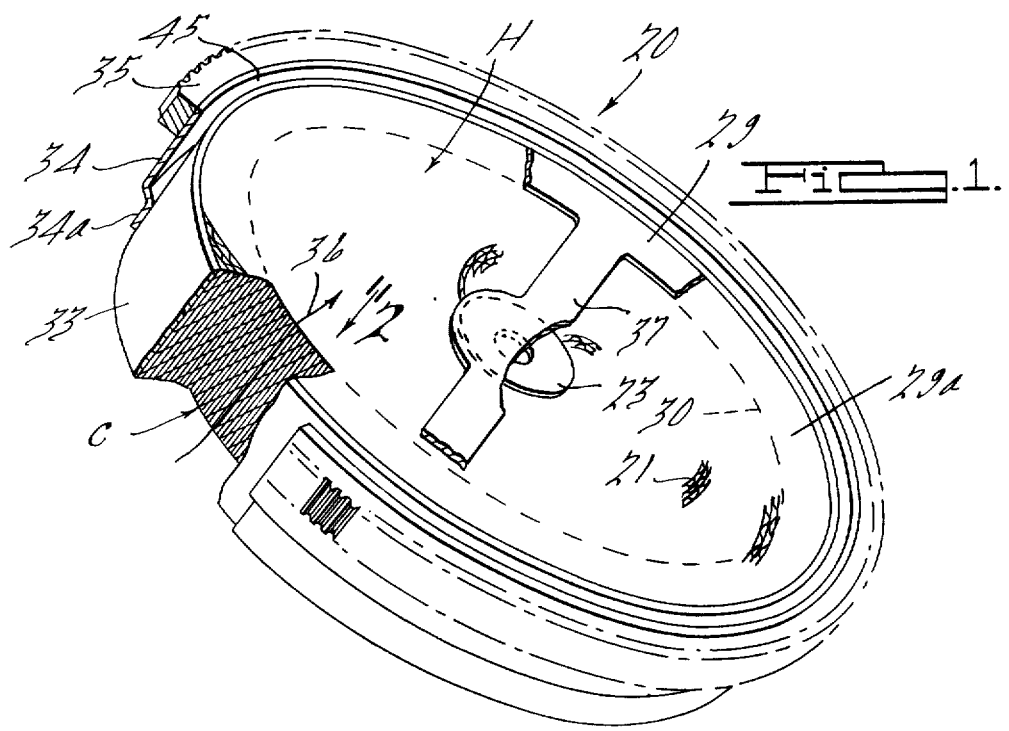
FIG. 1 is a diagrammatic isometric view showing the regenerator and seals of a gas turbine engine separated from the engine structure.
Figure 2:
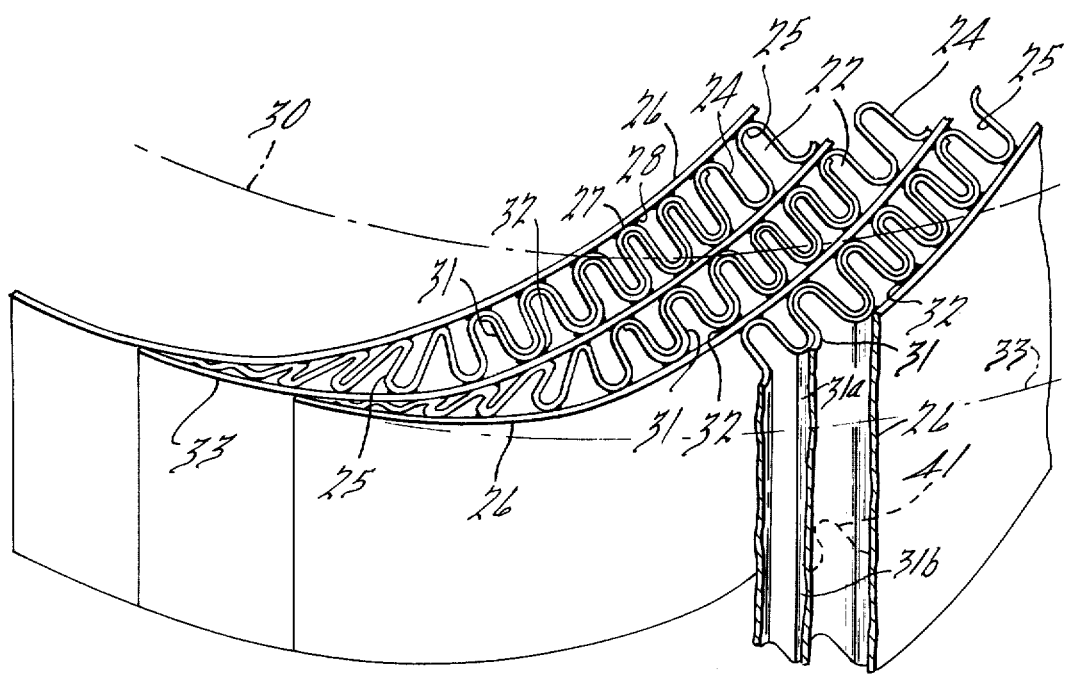
FIG. 2 is an enlarged fragmentary sectional view transverse to the axis of rotation, taken in the direction of the arrow 2 of FIG. 1, showing the sliding seal between the peripheral portion of the matrix and the radially adjacent inner portion of the matrix near the hot face prior to the initial thermal distortion.
Figure 3:
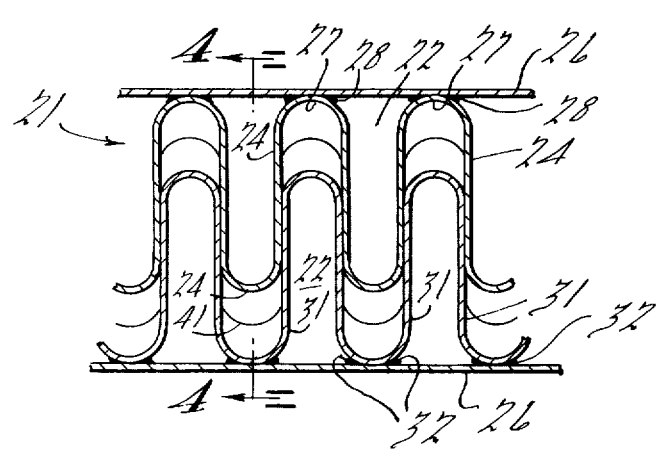
FIG. 3 is a view similar to FIG. 2, showing the cooled juncture or sliding seal between the peripheral and adjacent radially inner portions of the matrix after the first thermal cycle, the radially sliding portions of the cooled juncture being thermally contracted radially inward relative to the peripheral portion after having been thermally stressed and compacted radially against the latter portion during the preceding hot period of the thermal cycle.

Referring to the drawings, a rotatable drum type regenerator 20 for an automobile gas turbine engine is shown comprising an annular matrix 21 of thin-walled axial gas passages 22, FIGS. 2 and 3, having an inner hub 23. The gas passages 22 are elongated radially as illustrated in FIG. 2 and are formed by means of a plurality of corrugated sheet steel matrix segments or strips 24 having corrugations or convolutions 25. The segments 24 are in side-by-side relationship and extend spirally outward from the hub 23 to the outer periphery of the matrix 21, FIG. 1.

The segments 24 of each juxtaposed pair are spaced by a sheet steel strip 26 in contact tangentially with the adjacent bases 27 of the convolutions 25. The corrugated and spacer strips 24 and 26 extend spirally around the axis of the hub 23 and are secured together at fluid tight seals along their axially extending regions of contact, as for example by copper brazing 28. Thus the radially inner ends of the assembled strips 24 and 26 are spaced circumferentially around the hub 23 and their radially outer ends are similarly spaced circumferentially around the matrix periphery.

Extending spirally into a pheripheral portion 29a of the matrix 21 from a radially inner portion thereof bounded by a circular arc 30 are a plurality of corrugated sheet steel sealing members or inserts 31, each being disposed between a juxtaposed pair of the segments 24 and having its corrugations mating with and interfitting in sliding fluid sealing relationship, as described below, with the convolutions 25 of one of the segments of the pair. Each insert 31 is also coextensive axially with and secured as for example by copper brazing 32 at its regions of tangential contact with the associated strip 26 which spaces the insert 31 from the other corrugated segment 24 of the pair. In order to provide a circular cylindrical matrix periphery 33, the radially outermost few convolutions 25 may be crushed as illustrated in FIG. 2 between the outer end portions of the strips 26 as the latter converge to the outer cylindrical shape of the matrix. Also the radially outer strip 26 associated with each segment 24 may overlap the latter circumferentially to provide a thickened outer rim or periphery 33 sufficiently strong to support an annular bracket 34 for a ring gear 35. The bracket 34 is offset at 34a and welded to the thickened rim 33 adjacent the "cool" face of the matrix 21, as defined below, such that the body of the bracket 34 is spaced from the periphery 33 adjacent the "hot" face of the matrix to facilitate relative thermal expansion and contraction between the matrix periphery 33 and gear 35.

Each gas passage 22 comprises a channel or convolution 25 extending axially for the full axial dimension of the regenerator matrix 21, the mouth of each channel 25 opening in the radially opposite direction from the mouth of the next circumferentially adjacent channel 25 and being closed by the associated spacer strip 26. The brazing 28 between the bases 27 and strips 26, as well as the brazing 32 between the strips 26 and the bases of the convolutions of the seal inserts 31, extend the full axial length of the matrix 21. The partition strips 26 may be sheet steel of a thickness and composition comparable to the thickness and composition of the sheet material of the convolutions 25. Stainless steel has been employed heretofore for the matrix 21. By virtue of the flexible coupling described below, more economical grades of carbon steel can now be used without rupturing in consequence of thermal cycling. The strips 25 and 26 are preferably less than 0.002 inch thick and may be several inches in axial length. In a typical situation, the corss-sectional dimensions of each gas passage are on the order of magnitude of 0.01 inch circumferentially and about 0.125 inch radially or normally to the sheets 26 to provide as much heat exchange area as feasible in a regenerator of convenient size. The drawings are for illustration only and are obviously not to scale.

The generator 20 is mounted for rotation about the axis of its hub 23 within an engine housing which includes suitable baffles for directing comparatively cool high pressure inlet air in the direction of the arrow 36 through approximately the left half of the matrix 21, FIG. 1, in heat exchange relationship with the sidewalls of the gas passages 22. The inlet air is thus preheated as it flows through the hot matrix 21.

The preheated inlet air is then conducted through a combustion chamber and the turbine rotor stages of the engine to provide motive power. Thereafter the hot exhaust gas is directed oppositely from the arrow 36 thrugh the right half of the matrix 21, FIG. 1, in heat exchange relationship with the gas passages 22 to heat the same, whereupon the cooled exhaust gas is exhausted to the atmosphere. In consequence an axial temperature gradient will be effected in the matrix 21 from a comparatively cool lower axial end face C thereof to a comparatively hot upper axial end face H thereof.

In order to direct the gas flow as described, an annular peripheral seal 29 having its inner circumference indicated by the dotted circular arc 30 overlies a peripheral portion of the matrix 21 and extends circumferentially around the latter's hot upper face in sliding sealing relationship to prevent gas flow between the hot face of the matrix and annular seal. A cross arm seal 37 extends generally diametrically across the upper hot face of the matrix 21 in sliding sealing relationship and bifurcates at the hub 23. The seals indicated at 29 and 37 are fixed with respect to the engine housing and the seal 37 at least may overlie a corresponding cross arm seal in sliding sealing relationship with the cold face of the matrix 21, thereby to separate the latter into a comparatively high pressure left half and a lower pressure right half, as described below. Preferably the engine housing provides an annular chamber around the matrix periphery 33 in communication with the cool high pressure inlet air, thereby to bathe the periphery 33 in cool air and to insulate the regenerator 20 from exterior walls of the engine housing, as described in said copending application.

In its passage through the left half of the matrix 21 in the direction of the arrow 36, the inlet air is heated by contact with the sidewalls of the gas passages 22. In the passage of the exhaust gases in the opposite direction through the right half of the matrix 21, the sidewalls of the passages 22 are heated by these gases and the latter are thus cooled prior to being exhausted to the atmosphere. By virtue of the rotating regenerator 20, the hot portions are continually rotated across the seal 37 to render the gas turbine engine economically feasible by utilizing exhaust heat to preheat the inlet air.

The thin sidewalls of the matrix gas passages 22 radially inward of the inner circumference 30 of the peripheral seal 29 attain their operating temperatures in a manner of seconds by virtue of their heat exchange relationship with the gas flow, but the passages 22 underlying the peripheral seal 29 and shielded from direct contact with the gas flow frequently require a matter of minutes to attain their operating temperatures. In consequence, during a power demand from the engine, the temperature of the body of the matrix 21 inwardly of the circumference or arc 30 rapidly rises especially adjacent its hot upper face. This latter portion of the matrix 21 is caused to expand thermally against the slow-to-heat peripheral portion of the matrix 21 radially outward of the arc 30 and is thereby crushed against the latter. During the subsequent cooling phase, the radially inner body portion of the matrix 21 cools and contracts rapidly before the radially outer peripheral portion cools appreciably. Thus while the peripheral matrix portion is still in an expanded condition, the adjacent radially inner matrix portion tends to pull radially inwardly from the arc 30. After repeated cycles, the bond between the peripheral and inner matrix portions adjacent the arc 30 tends to rupture, without some provision to the contrary, and an extensive circumferentially extending crack develops at the region of the arc 30 especially adjacent the hot upper face of the regenerator 20 in FIG. 1.

Rupturing as described above is prevented by means of a flexible connection between the inner and peripheral portions of the matrix 21 adjacent the arc 30 throughout the major axial extend of the matrix 21 from the upper hot surface, as for example throughout approximately 80 percent of the axial length of the regenerator. The flexible connection comprises convoluted inserts 31 having convolutions mating with the convolutions 25 and coextensive axially therewith, one insert or strip 31 extending equal distances in opposite directions across the arc 30 and interfitting in radially slidng and sealing engagement with one of each of the strips 24, as explained below.

Figure 5:
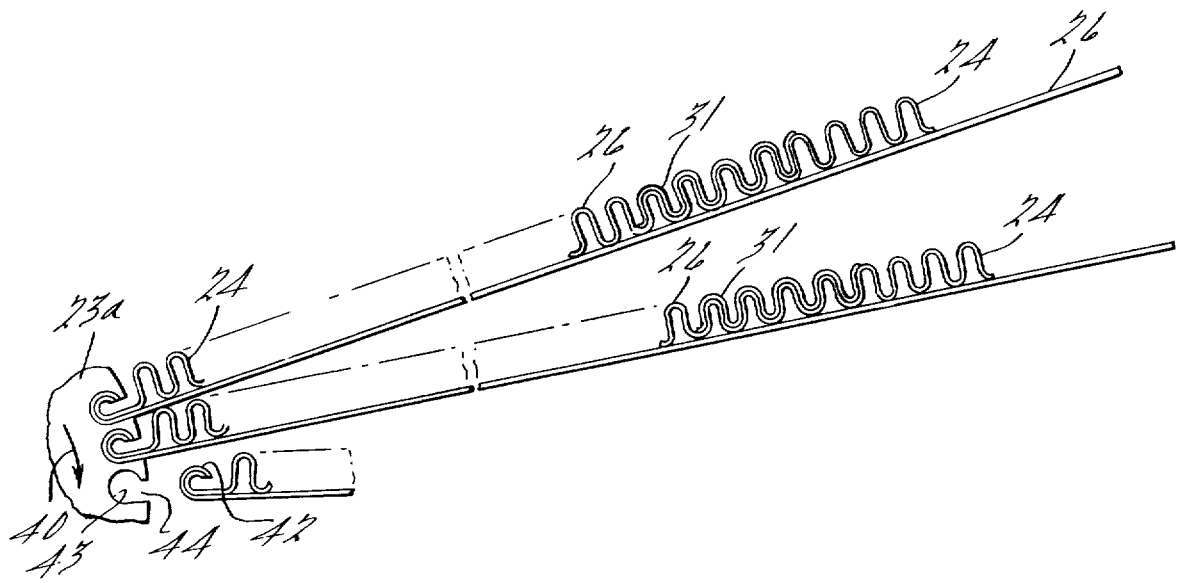
FIG. 5 is an enlarged fragmentary plan view of the "cool" axial end face, showing the elements of the matrix partially assembled and prior to being wound spirally to the final matrix shape.

During fabrication of the regenerator 20, the spiral strips or segments 24 and 26 of the matrix 21 are wound around the hub 23 with the inserts 21 assembled therebetween as illustrated in FIGS. 2 and 5 and the bases 27 of the convolutions 25 and of the mating convolutions of the inserts 31 are brazed throughout the entire axial length of the matrix 21 to the adjacent tangential strips 26 by dipping the entire matrix in a copper brazing solution. The copper adheres by capillary action as at 28 and 32 to the converging portions of the convolutions and strip 26.

In the present instance, prior to the assembly and brazing operations, a brazing preventative known to the trade as a stop-off is applied to the surface 31a of each insert 31 intended to confront and interfit in sliding sealing engagement with the convolutions 25 of one of the convoluted strips 24. The surface 31a extends from the upper hot face of the matrix 21, FIGS. 1 and 2, to the level indicated by the line 41. The latter will be at least 50 percent of the axial length of the regenerator 20 from the hot face and usually 60 percent to 80 percent of that axial length.

Figure 4:
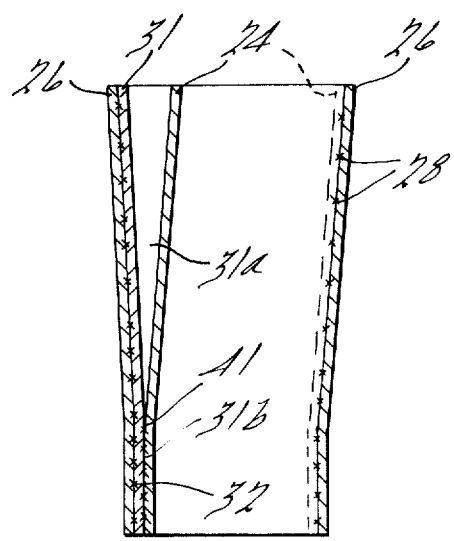
FIG. 4 is a sectional view taken in the direction of the arrows substantially along the line 4—4 of FIG. 3.

A copper paint or brazing preparation is then applied throughout the surface 31b comprising the remaining axial extent of each insert 31 below the line 41 and intended to interfit with the latter convolutions 25. Thus during the subsequent brazing operation, the convolutions 25 interfitting with the convolutions of the insert 31 will not be brazed together where stop-off is applied at 31a, thereby to effect a radially sliding juncture between these convolutions, FIGS 3 and 4, throughout at least the aforesaid 50 percent and preferably approximately 80 percent of the axial length of the regenerator 20 from the hot face. Where the brazing preparation is applied, i.e., throughout the remaining lower minor extent of the axial length of the matrix 21 in FIGS. 2 and 4, the interfitting convolutions of the segments 24 and inserts 31 will be brazed solidly together.

In consequence at least approximately 20 percent of the axial length of the convolutions 25 measured from the upper cool face, will be positively secured together by virtue of the brazing at 31b to the interfitting inserts 31 and at 32 between the latter and strips 26 to provide the necessary strength to withstand the pressure forces applied to the matrix, especially adjacent the arc 30, and the mechanical forces including frictional forces opposing rotation of the matrix, such as friction between the matrix 21 and the aforesaid rubbing seals, such as 29 and 37.

Consideration of the above described sliding juncture between the upper hot portions of the interfitting segments 24 and inserts 31 will not facilitate understanding of a major pressure force tending to shear the peripheral matrix portion 29a from the adjacent radially inner matrix portion. The pressure differential between the comparatively high pressure inlet air flowing upwardly through the matrix 21 at the left side of the diametrical seal 37 and the comparatively low nearly atmospheric pressure of the exhaust gases flowing downwardly through the matrix at the right side of the latter seal, FIG. 1, results in a pressure differential across the seal 37 amounting to approximately 45 PSI in a typical operating situation. This pressure differential is applied against an area of the matrix approximating the latter's vertical mid-section within the arc 30 in FIG. 1, which may for example be 15 inches in diameter and 3 ½ inches in axial length, tending to urge the inner body of the matrix 21 from left to right in FIG. 1 against the peripheral portion underlying seal 29.

Inasmuch as all of the corrugated segments 24 and strips 26 radially inwardly of the inserts 31 are brazed together throughout the axial length of the matrix, the major body portion of the matrix is an integral structure and tends to move as a unit when subjected to the aforesaid pressure differential. In consequence, if the above described sliding juncture above the line 41 in FIG. 4 were to be extended throughout the entire axial length of the regenerator, most of the pressure force acting on an area approximately equal to the vertical mid-sectional area of the matrix inwardly of the inserts 31 and effective to move the integral structure of the matrix 21 from left to right in FIG. 1 would be unopposed except adjacent the opposite ends of the cross seal 37 where the sliding juncture has no appreciable component of movement from left to right.

The resulting localization of the above described pressure force would result in a shearing force between the peripheral matrix portion at 29 and the radially adjacent inner portion on the order of magnitude of 50,000 PSI and in some instances much larger. The latter force is cyclic at a frequency determined by the speed of rotation of the regenerator 20 and in cooperation with the aforesaid thermal and frictional forces tends to shear the matrix 21 at the region of arc 30. By virtue of the brazing at 31b throughout at least the lower cooler 20 percent of the matrix 21, the above described pressure force, instead of being localized at the ends of the cross seal 37, is distributed around the entire circumference of the matrix throughout the axial extent of the brazing 31b, i.e., below line 41.

In the present instance the regenerator 20 is rotated by means of the ring gear 35 suitably secured to the upper portion of the annular support 34, which provides the gap 45 to accommodate relative radial expansion and contraction between the hotter lower portion of the regenerator periphery 33 and the cooler gear 35 bathed in the fresh inlet air as is customary. By the structure described, roation of the gear 35 by engine driven gear means, not shown, is imparted to the bracket 34 and thence to the matrix 21 through the latter's completely brazed portion 31b below line 41, which provides the necessary strength to resist the aforesaid circumferential shearing forces during operation.

The regenerator 20 is fabricated with the interfitting convolutions of the segments 24 and inserts 31 closely compacted together as in FIG. 2 prior to operation, with the portions of the interfitting segments 24 and inserts 31 below line 41 positively brazed together at 31b as described above, and with the corresponding portions above line 41 not brazed together to effect the sliding seal. The structure shown offers an advantage in fabrication because control of production tolerances is more readily maintained when the interfitting convolutions at the sliding seal are initially compacted, rather than only partially compacted initially prior to operation. During the first operating thermal cycle of the regenerator, the matrix 21 will tend to expand and the portions inwardly of the arc 30 will be deformed and compacted against the cooler peripheral portion at 29a. Thereafter when the matrix 21 cools and contracts with respect to the peripheral portion at 29a, the interfitting convolutions at the unbrazed hotter portions 31a of the radially sliding seal will separate as illustrated in FIG. 3. In this regard, although the interfitting convolutions of the segments 24 and inserts 31 are symmetrical with respect to lines normal to the strips 26 at their regions of tangency thereto, it is apparent from FIG. 1 that as the spiral segments 24 approach the periphery of the matrix, they approach conditions of circular concentricity about the axis of rotation of the matrix. Thus at the regions of the inserts 31 near the radially outer ends of the segments 24, the interfitting sealing convolutions enable a radial component of movement there-between upon radial inward contraction of the inner portion of the matrix 21 with respect to the peripheral portion 29a. In addition there might be a slight simultaneous circumferential component of relative movement between the interfitting convolutions resulting from the fact that the strips 26 tangent to the bases of the convolutions are not exactly circular about the matrix axis at the regions of the sliding seal inserts 31, but such circumferential component of movement does not interfere with the desired radial component of movement which enables the cyclic thermal expansion and contraction of the matrix without rupturing.

The portions of the matrix 21 at the regions of the inserts 31 may be permanently deformed during the first thermal cycle. However, during the next and subsequent thermal cycles, the matrix 21 will expand comparatively freely without asserting appreciably additional force against the peripheral portion at 29 by virtue of the radially spaced sliding relationship illustrated in FIG. 3 between the unbrazed upper portions of the interfitting convolutions above line 41 resulting from the first cycle. The radially spaced portions of the interfitting convolutions at the sliding seal 31 during successive hot cycles will return to the compacted interfitting position somewhat as shown in FIG. 2. The interfitting relationship between the convolutions at the sliding seal 31 may be repeatedly compacted and retracted between the positions illustrated in FIGS. 2 and 3 during successive heating and cooling cycles without causing rupture. The brazed portions 31b of FIG. 2 near the cooler lower face of the matrix 21 will remain closely compacted throughout the successive thermal cycles without rupture because the matrix 21 is subject to appreciably less stress adjacent its cool under face.

In the above regard, the drawings and FIG. 2 in particular are appreciably distorted as to dimensions and proportions. Preferably the spiral strips 26 and segments 24 cross the arc 30 at less than a 10° angle in order to enhance the above described radial component of sliding movement between the interfitting convolutions of the segments 24 and inserts 31. Also where the preferred copper brazing is described, it is to be understood that other brazing materials may be used and in fact the term brazing as employed herein refers broadly to metal to metal bonding, either with or without the use of additional metal.

Referring to FIG. 5, a preferred method of assembling the segments 24 and strips 26 is illustrated wherein a hub or winding spool 23a is employed with a plurality of radial slots 44 that enlarge inwardly at 43 to provide cylindrical openings extending axially whithin the hub 23a to receive the curled and interlocked ends 42 of the strips 26 and segments 24 as described below. One opening 43, 44 is provided for each segment 24 in the final matrix 21.

The radially inner end of each segment 24 is provided with a short linear extension adapted to extend to the radially inner end of the paired strip 26 in parallelism therewith. A convoluted segment 24 and strip 26 are paired in axially coextensive and side-by-side relationship as illustrated in FIG. 5 and are then interlocked at their radially inner ends by forming the curl or hook 42 whereby handling, storing and shipping of the sub-assemblies 24, 26 is facilitated until they are assembled with the hub 23a.

Prior to assembly of each sub-assembly 24, 26 with the hub 23a, the surface 31a of the insert 31 that is intended to interfit with a corresponding segment 24 is treated with the above mentioned brazing preventative or stop-off, and the remaining portion 31b of the latter surface is treated with the copper brazing material. Preferably the stop-off is applied first. Thus if the copper brazing coating partially overlaps the stop-off, and effective braze will not take place at the region of the overlap. The corresponding confronting surfaces of the segment 24 may be similarly treated if desired. Thereafter the convolutions of the insert 31 and segment 24 are pressed together in interfitting relationship as illustrated in FIG. 5, and the assembly is held together by friction to facilitate handling during subsequent operations.

The curl 42 of each sub-assembly 24, 26, 31 is then inserted axially into one of the sloted openings 43, 44, as in FIG. 5, and the hub 23a is then rotated in the direction of the arrow 40. Simultaneously the radially outer ends of the strips 26 are restrained frictionally, so that the assemblies 24, 26, 31 are flexed spirally around the hub 23a. Gradually the outer circumference defined by the radially outer ends of the strips 26 is decreased by a suitable forming means until the matrix is compacted to the final shape illustrated in FIGS. 1 and 2. Thereafter if desired, the hub 31a may be forced axially from the center of the compacted matrix and replaced by the hub 31 which is forced axially into the generally cylindrical space, formerly occupied by the hub 31a, as the latter is forced out.

The compacted matrix is then dipped in a copper brazing solution, whereby the brazing solution collects by capillary action at the above described locations 28 and 32. The matrix is then heated in an oven to complete the brazing operation.

We claim:

1. In a rotatable regenerator for a gas turbine engine, a matrix adapted for flow therethrough of comparatively cool high pressure inlet air and comparatively hot low pressure exhaust gas alternately in opposite axial directions to effect an axial temperature gradient in said matrix between axially opposed hot and cold faces thereof, said matrix comprising a plurality of convoluted matrix segments extending in side-by-side relationship spirally outward about the axis of the regenerator from a central region of the matrix to its periphery, each matrix segment and the next adjacent matrix segment comprising a pair of juxtaposed matrix segments, and sealing means securing a peripheral portion of said matrix to the adjacent inner portion of said matrix at a fluid seal for preventing gas flow circumferentially between said portions and for accommodating cyclic forces tending to rupture said seal comprising an insert between the matrix segments of each pair at the boundary region between said inner and peripheral portions, each insert having convolutions interfitting in sliding fluid sealing relationship with the convolutions of one of the matrix segments of said pair at opposite sides of said boundary throughout the major axial extent of said matrix from said hot face, said sealing means also comprising means for positively securing said juxtaposed marix segments together at the remaining axial extent thereof at said boundary region and means for positively securing each insert to the other matrix segment of said pair, the interfitting convolutions of each insert and matrix segment having radial components for permitting a radial component of movement between said juxtaposed matrix segments throughout said major axial extent at said boundary region, and means for positively securing said juxtaposed matrix segments together throughout their axial extent at locations spirally inward of said inserts.

2. In the combination according to claim 1, said peripheral portion being adapted to ride in sliding sealing engagement with a circumferentially extending rubbing seal to prevent axial gas flow through said peripheral portion, thereby to effect a sharp radial temperature gradient between said peripheral portion and the adjacent inner portion of said matrix adapted for axial gas flow therethrough, the convolutions of each insert interfitting with the convolutions of the associated one matrix segment both within said peripheral portion and adjacent inner portion.

3. In the combination according to claim 1, each matrix segment and insert being corrugated to provide axially extending gas flow channels.

4. In the combination according to claim 1, each insert and said interfitting convolutions extending axially for the axial extent of said matrix, and said means for securing said juxtaposed matrix segments together at said remaining axial extent thereof including a brazed connection between said interfitting convolutions at said remaining axial extent.

5. In the combination according to claim 1, said means for securing said juxtaposed matrix segments together at locations spirally inward of said inserts comprising a strip of non-convoluted sheet material extending spirally betwen each juxtaposed pair of matrix segments and tangentially to the convolutions thereof at a plurality of axial lines of tangency spaced along the spiral of said strip, and a plurality of brazed connections between each strip and the convolutions of said juxtaposed pair of matrix segments adjacent said lines of tangency.

6. In the combination according to claim 5, each strip extending spirally between one of said inserts and said other of said pair of matrix segments spaced by said one insert and also extending tangentially to the convolutions of said one insert and other matrix segment at a plurality of axial lines of tangency spaced along the spiral of said strip, and said means for securing each insert to the associated other of said pair of matrix segments comprising a plurality of brazed connections between each strip and the convolutions of the associated one insert and other matrix segment adjacent the last named lines of tangency.

7. In the combination according to claim 6, each insert and said interfitting convolutions extending axially for the axial extend of said matrix, and said means for securing said juxtaposed matrix segments together at said remaining axial extent thereof including a brazed connection between said interfitting convolutions at said remaining axial extent.

8. In the combination according to claim 7, said convolutions comprising corrugations to provide axially extending gas flow channels brazed to the proximate strip adjacent said lines of tangency to comprise said brazed connections.

9. In the combination according to claim 1, each pair of matrix segments and insert therebetween being corrugated to provide axially extending side-by-side channels, the interfitting convolutions of said insert and one matrix segment of said pair comprising mating closely interfitting channels, the interfitting channels having channel bases in juxtaposition prior to operation of said regenerator in said engine and being separable during engine operation by reason of said sliding relationship.

10. In the combination according to claim 9, each insert and said interfitting convolutions extending axially for the axial extent of said matrix, and said means for securing said juxtaposed matrix segments together at said remaining axial extent thereof including a brazed connection between said interfitting convolutions at said remaining axial extent.

11. In the combination according to claim 9, said means for securing said juxtaposed matrix segments together at locations spirally inward of said inserts comprising a strip of non-convoluted sheet material extending between each juxtaposed pair of matrix segments and being brazed to said channel bases thereof, each strip also extending between one of said inserts and said other of said pair of matrix segments spaced by said one insert, said means for securing each insert to the associated other of said pair of matrix segments comprising a brazed connection between each strip and the channel bases of the latter insert and matrix segment.

12. In the combination according to claim 11, each insert and said interfitting convolutions extending axially for the axial extent of said matrix, and said means for securing said juxtaposed matrix segments together at said remaining axial extent thereof including a brazed connection between said interfitting convolutions at said remaining axial extent.

13. In the combination according to claim 12, a peripheral seal in sliding sealing engagement with said peripheral portion of one of the faces of said matrix to prevent axial flow of gases through said peripheral portion at the region of said peripheral seal, the radially inner edge of said peripheral seal being at said boundary region between said peripheral and adjacent inner portions of said matrix.

14. In the method of operating a gas turbine engine, the steps of fabricating a regenerator having the structure of claim 9 and of operating said engine to effect a differential thermal expansion between said peripheral and inner portions of said matrix to expand said inner portion radially outward against said peripheral portion, thereby to compact the bases of said interfitting channels tightly together, and thereafter to effect a differential thermal contraction between said peripheral and inner portions to contract said inner portions radially inward from said peripheral portion to enable separation of the bases of said interfitting channels by reason of said sliding sealing relationship.

15. In the method of fabricating a matrix for a rotatable regenerator for a gas turbine engine, the steps of providing a plurality of corrugated matrix segments adapted to extend radially with respect to the axis of said regenerator and to be flexed in side-by-side relationship spirally about said axis, providing a plurality of corrugated inserts, each adapted to extend spirally within a peripheral portion of said matrix between one of each juxtaposed pair of segments with the corrugations of each insert interfitting in radially sliding and fluid sealing relationship with the corrugations of one matrix segment of the associated juxtaposed pair, assembling said matrix segments and inserts together with said segments extending spirally about said axis from radially inner ends thereof adjacent said axis to radially outer ends thereof adjacent the periphery of said matrix and with one of said inserts extending spirally between one of each juxtaposed pair of said segments at said peripheral portion in said radially sliding and fluid sealing relationship throughout a major axial extent of said matrix from one axial end thereof, said assembling comprising the securing of each insert rigidly to said one matrix segment throughout the remaining minor axial extent of said matrix to prevent said sliding relationship throughout said minor extent, and also comprising the securing of said juxtaposed matrix segments rigidly together inwardly of said inserts.

16. In the method according to claim 15, said assembling including the step of applying a brazing preventative between each insert and said one matrix segment throughout said major axial extent to prevent brazing between each insert and said one segment throughout said major axial extent, and thereafter by an operation including brazing securing each insert to its associated pair of segments except at the location of said brazing preventative.

17. In the method according to claim 15, said assembling including the steps of applying a brazing preventative to the surface of each insert throughout said major axial extent intended for said sliding engagement and of applying a brazing preparation to the remaining surface of each insert, thereafter inserting said inserts between said juxtaposed matrix segments, and thereafter by an operation including brazing securing each insert to its associated pair of segments except to said one segment throughout said major axial extent.

18. In the method according to claim 17, said assembling including subsequent to the applying of said brazing preventative and brazing preparation and prior to said brazing, the step of confining the radially inner ends of said segments in circumferentially spaced relationship along an inner circular arc concentric with said axis, thereafter flexing said segments into side-by-side relationship spirally outwardly about said axis with each insert extending between its associated pair of segments and spirally across an outer circular arc concentric with said axis at the mid-region of said peripheral portion of said regenerator, and confining the radially outer ends of said segments along the outer periphery of said matrix.

19. In the method according to claim 18, the confining of said radially outer ends of said segments comprising the confining of said radially outer ends in circumferentially spaced relationship.

20. In the method according to claim 15, said step of assembling including the spacing of each juxtaposed pair of segments by a strip of flat stock extending from the radially inner to the radially outer ends of said segments tangentially to the corrugations of the insert between said pair of segments and also to the corrugations of said pair of segments except for the corrugations of said one segment that interfit with the corrugations of said insert.

21. In the method according to claim 20, said assembling including the step of applying a brazing peventative between each insert and said one matrix segment throughout said major axial extent to prevent brazing between each insert and said one segment throughout said major axial extent, and thereafter by an operation including brazing securing each insert to its associated pair of segments except at the location of said brazing preventative.

22. In the method according to claim 20, said assembling including the steps of applying a brazing preventative to the surface of each insert throughout said major axial extent intended for said sliding engagement and of applying a brazing preparation to the remaining surface of each insert, thereafter inserting said inserts between said juxtaposed matrix segments, and thereafter by an operation including brazing securing each insert to its associated pair of segments except to said one segment throughout said major axial extent.

23. In the method according to claim 22, said assembling including subsequent to the applying of said brazing preventative and brazing preparation and prior to said brazing, the step of confining the radially inner ends of said segments in circumferentially spaced relationship along an inner circular arc concentric with said axis, thereafter flexing said segments into side-by-side relationship spirally outwardly about said axis with each insert extending between its associated pair of segments and spirally across an outer circular arc concentric with said axis at the mid-region of said peripheral portion of said regenerator, and confining the radially outer ends of said segments along the outer periphery of said matrix.

* * * * *